US007346527B2

(12) United States Patent
McKay et al.

(10) Patent No.: US 7,346,527 B2
(45) Date of Patent: Mar. 18, 2008

(54) METHOD AND SYSTEM FOR GATHERING AND DISSEMINATING QUALITY PERFORMANCE AND AUDIT ACTIVITY DATA IN AN EXTENDED ENTERPRISE ENVIRONMENT

(75) Inventors: Mina L. McKay, Raleigh, NC (US); Sachin S. Chandra, Fishkill, NY (US); Robert D. Hayes, Poughkeepsie, NY (US); Andrew D. Kostic, Kingston, NY (US); John S. Maresca, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 09/749,846

(22) Filed: Dec. 27, 2000

(65) Prior Publication Data

US 2002/0082891 A1    Jun. 27, 2002

(51) Int. Cl.
*G06F 9/44* (2006.01)
(52) U.S. Cl. .................... 705/7; 705/8; 705/10
(58) Field of Classification Search ............ 705/7–10
See application file for complete search history.

(56) References Cited

U.S. PATENT DOCUMENTS 5,765,138 A * 6/1998 Aycock et al. ............ 705/7
5,855,005 A * 12/1998 Schuler et al. ............ 705/4
6,154,753 A * 11/2000 McFarland ................ 715/508
2001/0042088 A1 * 11/2001 Hotchkiss et al. ......... 707/530
2002/0029222 A1 * 3/2002 Key .......................... 707/102
2002/0108104 A1 * 8/2002 Song et al. ................ 717/140
2003/0014318 A1 * 1/2003 De La Motte et al. .... 705/26

FOREIGN PATENT DOCUMENTS

EP           0736827 A2 *   9/1996

OTHER PUBLICATIONS

U.S. Appl. No. 60/231,165.*
Bons et al. "A Formal Specification of Automated Auditing of Trustworthy Trade Procedures for Open Electronic Commerce." Proceedings of the Thirty-second Annual Hawaii International Conference on System Sciences, vol. 6, Jan. 1999.*
Rittenberg, Larry E. "The Effects of Internal Audit Outsourcing On Perceived External Audit Independence." Auditing, vol. 18, pp. 27-40, 1999.*

* cited by examiner

*Primary Examiner*—Susanna M. Diaz
(74) *Attorney, Agent, or Firm*—Cantor Colburn LLP; Derek Jennings (57) ABSTRACT

Method, system, and storage medium for facilitating supplier auditing functions in a communications network environment. The method includes receiving a request from a user system associated with an enterprise system to initiate an activity. The activity includes scheduling an audit for performing an initial or ongoing qualification of a supplier enterprise. The method also includes retrieving data from at least one database by the enterprise system. The data corresponds to the activity selected. The method further includes transmitting the data to the user system. The enterprise system includes a quality information network application for executing activity options.

70 Claims, 5 Drawing Sheets

FIG. 5
AUDIT PROCESS FLOW

METHOD AND SYSTEM FOR GATHERING AND DISSEMINATING QUALITY PERFORMANCE AND AUDIT ACTIVITY DATA IN AN EXTENDED ENTERPRISE ENVIRONMENT

BACKGROUND OF THE INVENTION

This invention relates generally to a computer-based method and system for supply chain management, and more particularly, this invention relates to a method and system for gathering and disseminating quality performance and audit activity data in an extended environment.

With the advent of the Internet and related technologies, complex networking systems have evolved that enable distant trading partners operating disparate computer systems to interact with one another. The Internet provides a ubiquitous message routing architecture that supports reliable inter-business connectivity around the world, based on common communication protocols and common standards for system interoperability. Further, the Internet and related intranet and extranet technologies offer a relatively low cost of entry, making them practical for use by large and small businesses alike. Web-based security issues have been minimized through the use of intranets that connect a business' internal processes to the applications and data they need and extranets that connect external processes to the applications and data they need. Firewalls or security devices are added to protect against unauthorized access to the internal network and to isolate unauthorized Internet access from the extranet. With this new technology in place, existing trading barriers between trading partners can be removed, allowing for a synchronized flow of information.

A recent trend in electronics manufacturing involves contracting out some or all of the manufacturing of a company's products to third party manufacturers which then build these products according to specification. This arrangement, known as outsourcing, results where the original manufacturer (called an Original Equipment Manufacturer, or OEM) buys assemblies in bulk from third-party contract manufacturers and then customizes them for a particular application. It then markets and sells the customized equipment under its own name. By outsourcing the manufacturing and assembly of these goods, established OEMs are able to focus on other business areas such as new product development and customer relationship management. Additionally, as product designs and components are becoming increasingly complex and frequently updated, a contract manufacturer with specialized skills may be better equipped to accommodate the changing technology. By outsourcing to meet peak demands, an OEM may be able to avoid having to build new facilities and/or hire new people.

An OEM who is outsourcing the manufacturing of its products needs to be able to collaborate with its contract manufacturers and suppliers before, during, and after the manufacturing cycle in order to achieve maximum efficiency of the production process. One area of collaboration is supplier auditing and reporting. Technology shifts are causing new technical suppliers to rise in an ever increasing worldwide space. With this rise in suppliers, comes the need for new quality control measures including auditing processes. Before integrating a supplier technology into an OEM's product, a supplier is often subjected to a rigorous audit to ensure that correct technical processes are followed and to ensure technical capability. Supplier audit management must be able to handle the audit process where the OEM has offices located around the world and buys from suppliers equally spread out. Traditional methods of qualifying suppliers and performing auditing procedures often result in redundant or unnecessary audits where inefficient, incomplete, or outdated records provide incorrect information. This is compounded by the fact that multiple procurement divisions of an OEM may not always know what other divisions are doing due to inadequate communications, employee turnover, and/or geographic separation. Further, old auditing methods that involved tracking down a particular auditor who possessed the requisite skills necessary to perform the audit was tedious and time consuming and often involved scheduling the auditor to travel excessive distances to the audit sites. Finally, old audit methods provided inconsistent results where audit reports took on different formats depending upon the division requesting the audit, resulting in non-standardized audit reports and unsatisfactory results. The present invention seeks to eliminate or reduce the above inefficiencies by providing a centralized storage system and process for creating, editing and storing auditing schedules, reports, and reference materials via a collaborative, web-enabled workgroup application.

SUMMARY OF THE INVENTION

An exemplary embodiment of the invention relates to a computer-based method and system for supply chain management, and more particularly, this invention relates to a method and system for gathering and disseminating quality performance and audit activity in an extended environment. The system includes a manufacturing enterprise system comprising a host system operating a web server, an applications server, and a database manager; a data storage device in communication with the host system, and at least one terminal for accessing the host system. The manufacturing enterprise system runs on a network that is coupled to the Internet and is accessible to an outside enterprise or trading partner identified with having proper access permissions. The applications server executes a set of programs for managing the manufacturing enterprise system, including the quality information network application of the present invention. Audit scheduling information, reference inquiries, and reporting data are inputted into the manufacturing enterprise system via the quality information network application where analysis, editing, and other functions are performed on the inputs.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

The quality information network application is a collaborative tool used to facilitate the supplier auditing and reporting processes in an extended enterprise environment. It provides a centralized storage system in which audit schedules, reports and miscellaneous documents can be created and viewed in a collaborative manner by various users inside and outside of an organization on a tiered-access basis. It allows outsiders of the organization to submit comments and view a limited portion of information in the quality information network databases via a secure network connection. System administrators for the organization establish and maintain the access permissions and set parameters for users of the quality information network tool in keeping with the objectives of the organization.

Figure 1:
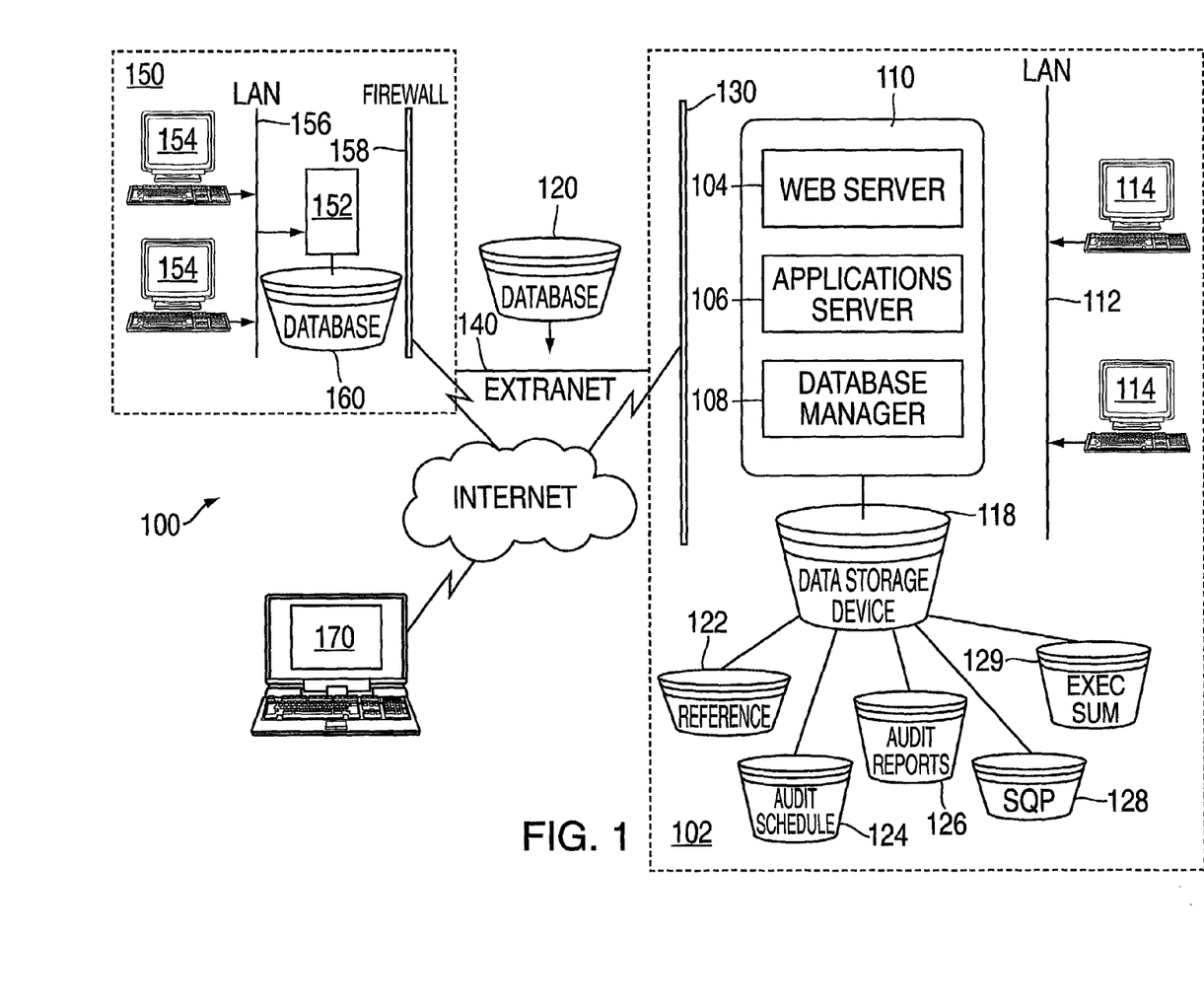
FIG. 1 is a block diagram of a portion of the system that includes a plurality of workstations and servers on which the quality information network application is implemented.

In an exemplary embodiment, the quality information application is implemented through a networked system such as that shown in FIG. 1. Although not necessary to realize the advantages of the present invention, system 100 may be part of a wide area network in which different geographical locations are interconnected, either by high-speed data lines or by radio links, interconnecting hundreds of workstations at widely disparate locations. In the simplified diagram of FIG. 1, system 100 includes an organization 102 comprising a web server 104, an applications server 106, and a database server 108 that are located on a host system 110 and connected through a network 112 to workstations 114. The term "organization" refers to the system implementing the quality information network application. Network 112 may comprise a LAN, a WAN, or other network configuration known in the art. Further, network 112 may include wireless connections, radio-based communications, telephony-based communications, and other network-based communications. For purposes of illustration, however, network 112 is a LAN. A firewall 130 limits access to organization 102 to those users outside of organization 102 who possess proper access permissions. Firewall 130 may comprise a gateway router, proxy server or a combination of similar hardware/software devices readily known by those skilled in the art.

Host system 110 is running suitable web server software designed to accommodate various forms of communications and which allows information in data storage device 118 to be published on a web site. For purposes of illustration, host system 110 is running Lotus Domino (TM) as its server software. Applications server 106 executes the quality information network tool, among other applications utilized by organization 102. Applications server 106 is also running a groupware application such as Lotus Notes (TM) which allows remote users to access information through its replication capabilities, provides e-mail services, and supports a secure extranet architecture.

Data storage device 118 resides within intranet 112 and may comprise any form of mass storage device configured to read and write database type data maintained in a file store (e.g., a magnetic disk data storage device). Data storage device 118 is logically addressable as a consolidated data source across a distributed environment such as network system 100. The implementation of local and wide-area database management systems to achieve the functionality of data storage device 118 will be readily understood by those skilled in the art. Information stored in data storage device 118 is retrieved and manipulated via database server 108.

Data storage device 118 provides a repository for databases including a reference database 122, an audit schedule database 124, an audit reports database 126, a supplier qualiy performance database 128, an executive summary reports database 129, and any other information desired by organization 102 for use by the quality information network tool. These features are further described herein.

System 150 comprises a web server 152 that connects workstations 154 to an intranet 156 and to the Internet. Firewall 158 provides security and protection against unauthorized access to internal network information from outside sources. Each of workstations 154 may access web server 152 via internal web browsers (not shown) located on workstations 154. A data storage device 160 is coupled to server 152. Selected data fields and data from audit reports database 126 are replicated to database 120 and are accessible to system 150 via extranet 140. System 150 is typically an existing supplier or trading partner of organization 102. The terms 'supplier' or 'contract manufacturer' and 'trading partner' are used interchangeably throughout this description. Remote workstation 170 is coupled to organization 102 via a web browser (not shown) and modem (not shown) for communicating with organization 102.

A variety of user types may utilize the quality information network tool. These user types help define the nature and extent of access to data provided by organization 102. For purposes of illustration, four user types are described herein; however, an organization implementing the quality information network tool may define its own user types.

Divisional Users. Divisional users are typically engineers and developers of organization 102. Divisions of organization 102 are classified or sorted according to the product being manufactured. For example, one division may be dedicated to manufacturing/assembling personal computers. A second division might be responsible for the production of mainframe computers. A third division might involve storage devices. Divisional users may create, update, and transfer documents in data storage device 118 to other authorized users, but are limited to modifying only those documents relating to their division. A divisional user may be a requester of an audit.

Suppliers/Contract Manufacturers. These users are external to the organization but have a need to access certain information contained in data storage device 118. These users are restricted to viewing through the Internet or extranet 140 a limited segment of information in data storage device 118 to ensure the overall confidentiality of the documents contained therein. Trading partners at system 150 can input comments or attachments through data fields replicated from database 126 and submit them via extranet 140 to the data storage device 118.

Executive Readers. These users are typically high level executives of organization 102 with 'view only' access to executive summary database 129. Access is restricted to general information and executive summary data relating to audit reports and documents and is used for informational purposes.

Administrators. Administrators of organization 102 determine the access requirements for internal and external users of the quality information tool and maintain access control lists. They also provide user support as necessary. Administrators may further be categorized by division.

Access control lists store the names of authorized users of the databases stored in data storage device 118 and each user is assigned an access level by an administrator of organization 102. Only administrators can add, modify or delete authorized users in the access control list.

Figure 2:
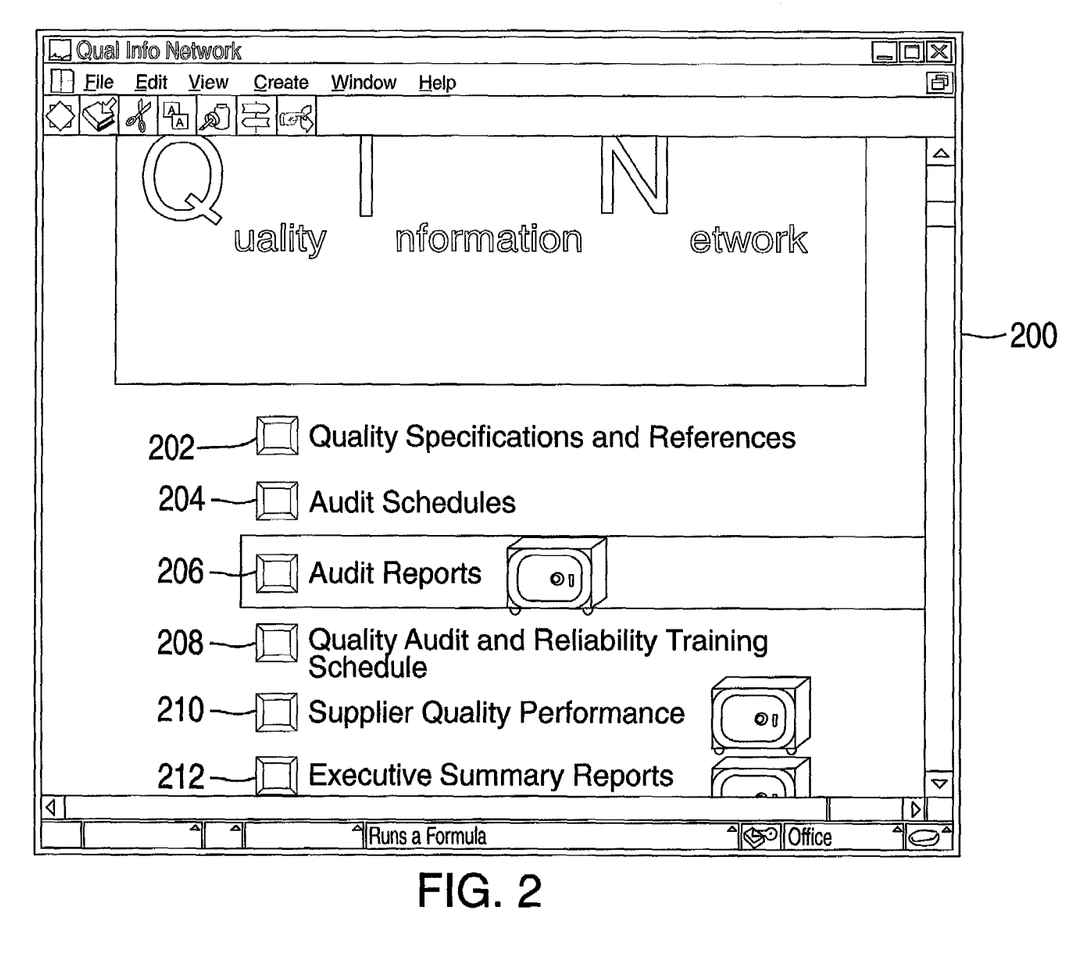
FIG. 2 illustrates an exemplary main menu screen for the quality information network application.

A user accesses the quality information network application via a main menu screen as shown in FIG. 2. The options available to the user on main menu screen 200 include "Quality Specifications and References" 202, "Audit Schedules" 204, "Audit Reports" 206, "Quality Audit and Reliability Training Schedule" 208, "Supplier Quality Performance" 210, and "Executive Summary Reports" 212. These options are further described herein.

Figure 3:
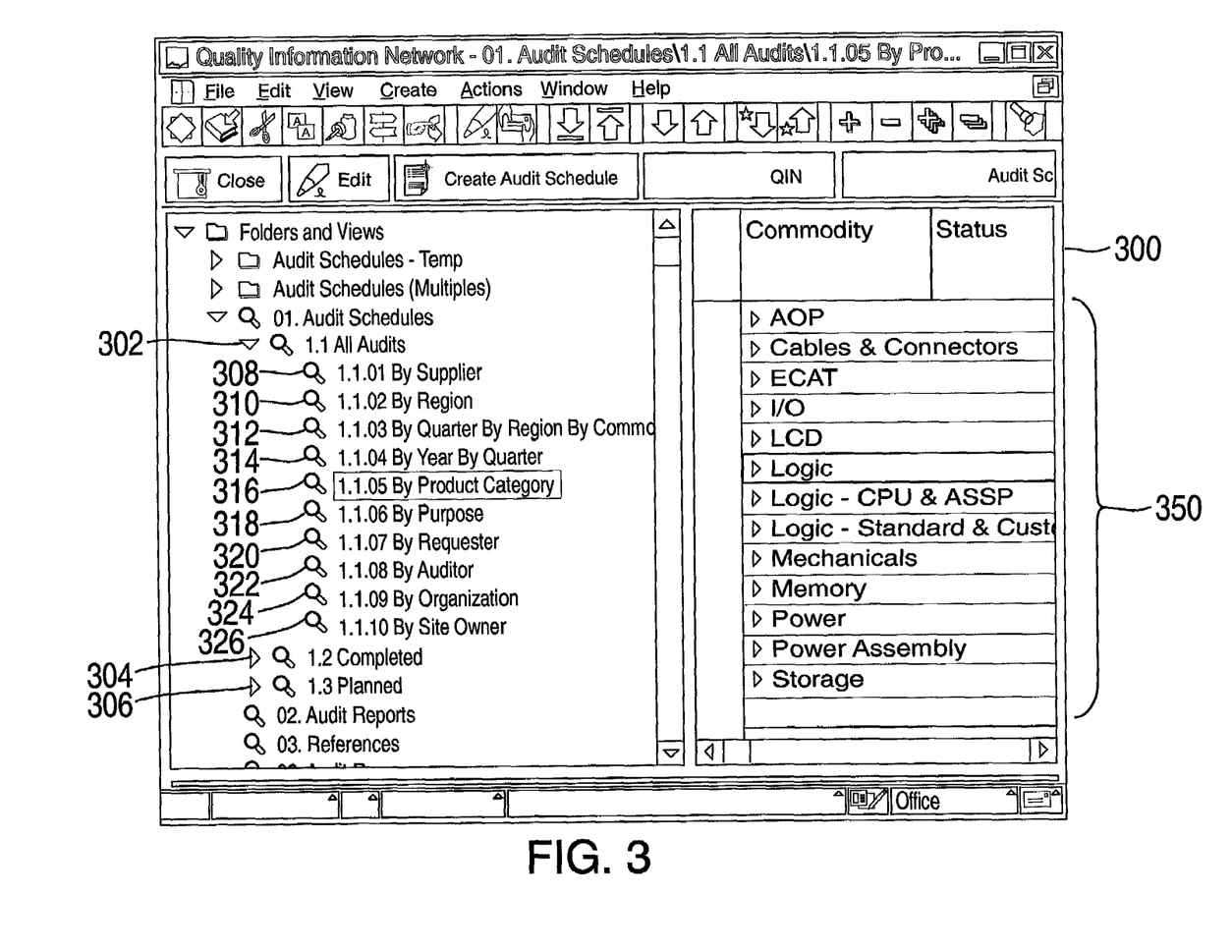
FIG. 3 illustrates an exemplary audit schedule menu and product category submenu screen for the quality information network application.

By selecting "Audit Schedules" 204, a user can perform a variety of tasks such as viewing, editing or creating an audit schedule. As illustrated in FIG. 3, a user who desires to view an audit schedule may do so by selecting "All Audits" 302, "Completed" 304, or "Planned" 306, whereby the quality information network tool retrieves the selected schedules for viewing. A user can further tailor the search for schedules to view all audit schedules broken down by: supplier 308, region 310, quarter by region by commodity 312, year by quarter 314, product category 316, purpose 318, requester 320, auditor 322, organization 324, and site owner 326. For example, a user selects "All Audits" 302 by product category 316 and is presented with a list of commodities as illustrated in submenu 350 of FIG. 3. The user then selects a commodity from submenu 350 and is presented with all audit schedules for that chosen commodity (not shown).

Figure 4:
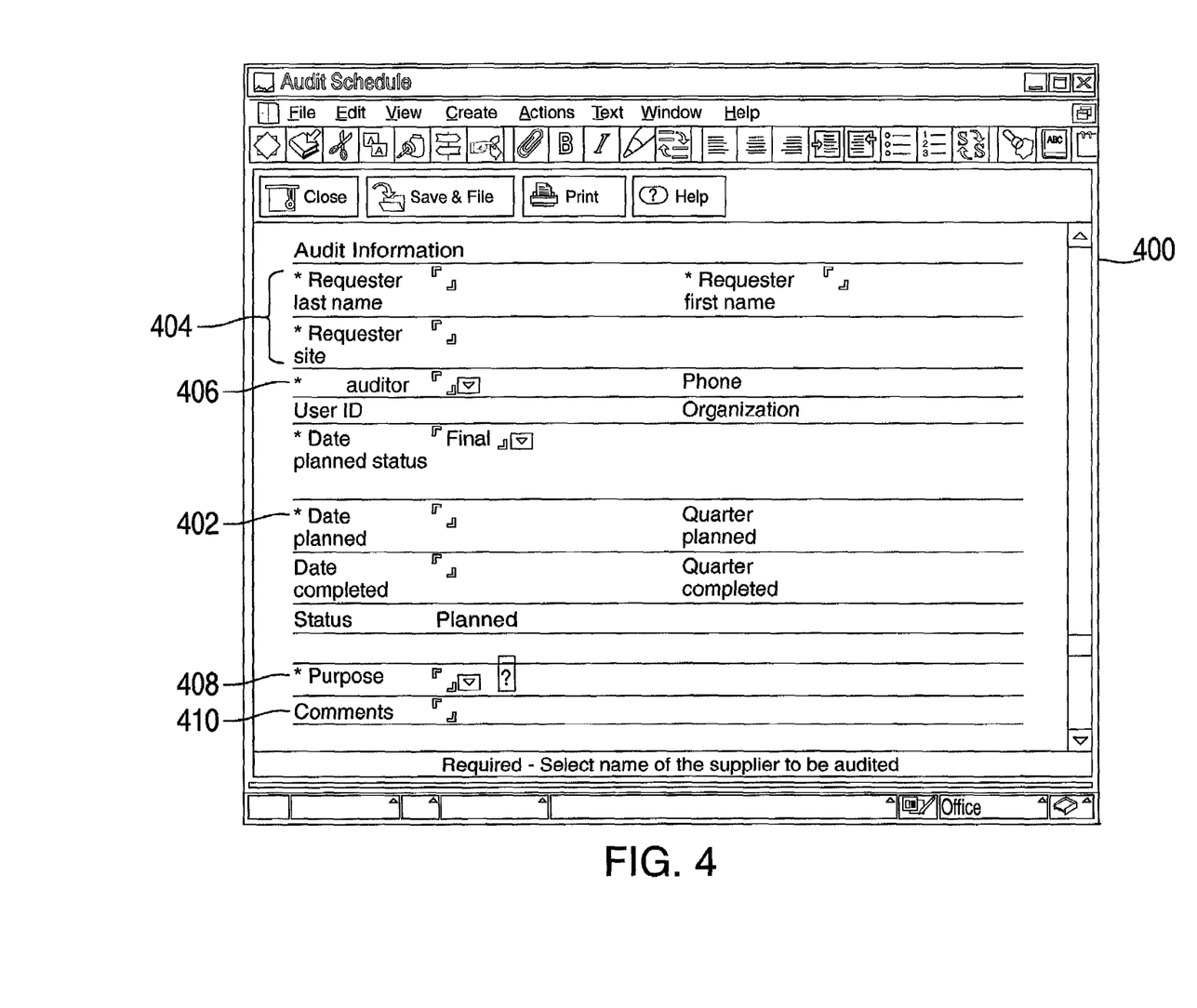
FIG. 4 illustrates an exemplary audit schedule form screen for the quality information network application.

To create a new audit schedule, the user selects a commodity from the list on submenu 350, and the schedule form 400 of FIG. 4 is presented to the user. The user enters required data into the fields presented such as supplier name and address (not shown), date or quarter planned 402, requester information 404, auditor selected to perform the audit 406, purpose for the audit 408, and any additional comments 410 as necessary. The quality information tool provides drop down items for selected data fields to allow for convenient, standardized entries as shown generally in form 400.

Results from completed audits may be viewed by divisional users of organization 102 by selecting "Audit Reports" 206 from main menu 200 of FIG. 2. Audit reports provide detailed information concerning the subject audit from the auditor 406 assigned and listed on schedule form 400. These reports are condensed in summary form by the quality information network tool and stored in executive summary database 129 for easy access and viewing by managing executives of organization 102. In this manner, all desired levels of management are able to keep apprised of audit-related activities and supplier performance. Having this information enables management to make instant business decisions.

Specific audit data is extracted from these audit reports and stored in supplier quality performance database 128 by the quality information network tool for rating purposes. Supplier quality performance database 128 contains performance indicators for audited suppliers measured by business rules adopted by organization 102 in order to compare and rate various suppliers. This information allows organization 102 to spot performance trends among suppliers audited such as areas of strength or weakness, specific technology capabilities, as well as other performance factors. It also creates a historical view of all audits performed so that organization 102 can quickly determine when or whether a supplier should be scheduled for an audit.

Reference database 122 contains technical information such as audit specifications, industry quality standards, as well as standardized reporting forms for selection by an auditor of organization 102. A divisional user of organization 102, such as an auditor, may need to know what the minimum industrial standards are for a certain product or component in order to verify whether a supplier is in conformance with those standards. An auditor may also want to access reference database 122 to ensure that the quality information sought via the scheduled audit is in conformance with organization's 102 audit specifications. Also included in reference database 122 is an updatable training section for auditing divisional users who want to improve their auditing skills. This section provides a list of auditing classes, seminars, and job resources available to interested parties of organization 102. In this manner, the auditing branch of organization 102 is kept apprised of new government regulations concerning industry standards, as well as auditing techniques and procedures.

Figure 5:
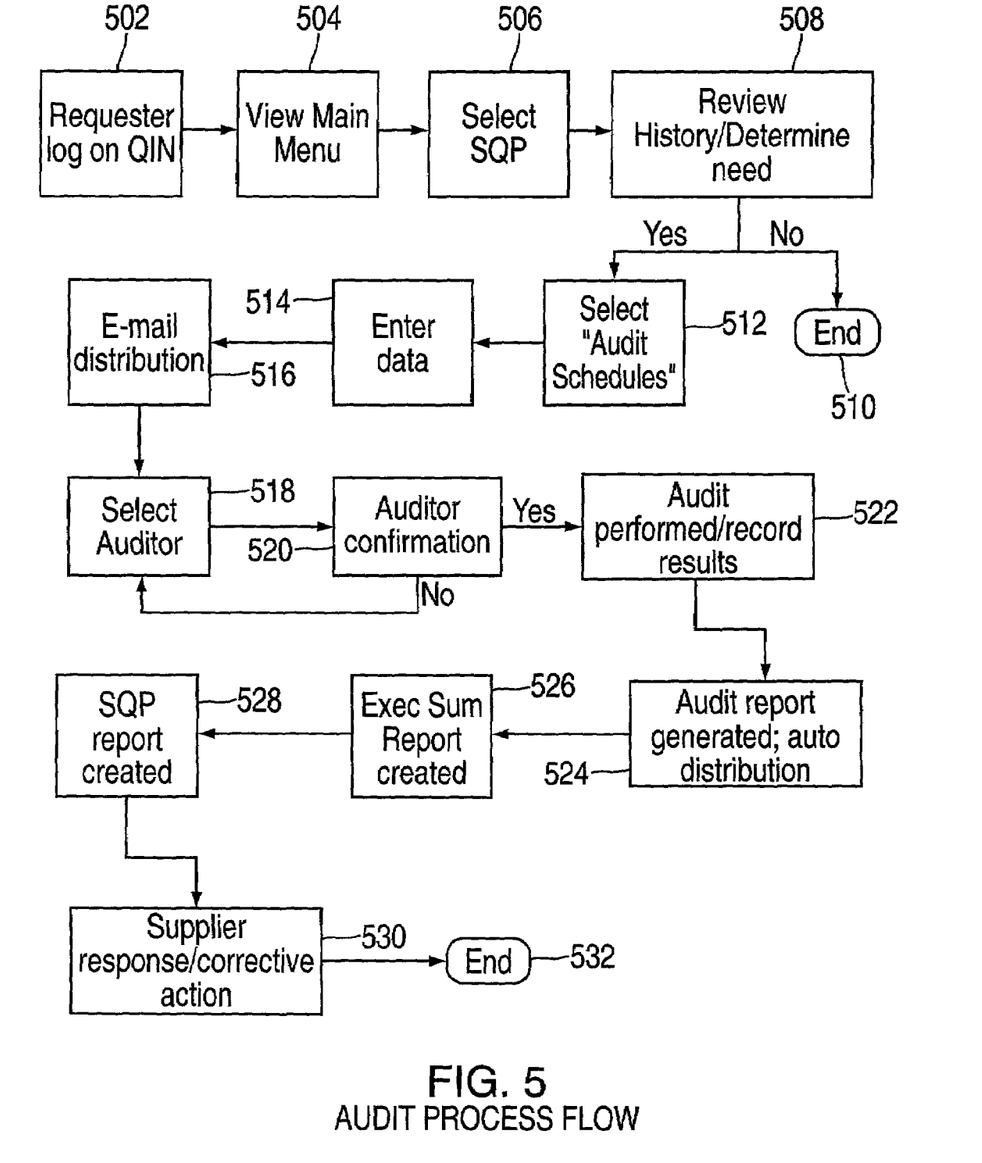
FIG. 5 is a flowchart describing the quality information network audit process.

FIG. 5 illustrates a sample process flow for the quality information network tool describing how a divisional user of organization 102 who is considering scheduling an audit proceeds via the tool. A requester at one of workstations 114 or remote workstation 170 logs on to the quality information network tool at step 502. The main menu screen 200 illustrated in FIG. 2 appears at step 504. In order to assess whether an audit is necessary for a given supplier, the requester first selects the supplier quality performance option 210 of FIG. 2 at step 506. The quality information tool retrieves selected information pertaining to that supplier from supplier quality performance database 128 and delivers it to the user. The user then reviews the supplier record which contains a history of audits and reporting documents pertaining to that supplier at step 508. From this information, the requester assesses whether an audit is required. For example, organization 102 has a policy to audit a particular class of suppliers on a semi-annual basis before renewing contracts for work. The supplier record stored in database 128 reveals that an audit has not been performed for ten months. In this case, the requester would need to schedule an audit. If the requester determines that an audit is not required, the process ends at step 510. Otherwise, flow proceeds to step 512 where the requester selects "Audit Schedules" 204 from main menu 200. The data required as illustrated in FIG. 4 is entered at step 514. The requester can select who this information will be distributed to at step 516 or the quality information tool may automatically designate a distribution list according to business rules defined by organization 102. The requester selects an auditor to perform the audit at step 518. This can be accomplished via a drop down tool as illustrated generally in FIG. 4 in auditor field 406. The quality information network provides a list of auditors which may be categorized by specialty, skills, and/or geographic location. The tool may also be configured to pre-qualify an auditor for the requester based upon information provided such as audit site location, commodity, etc. Further, the quality information network tool automatically generates an e-mail to the auditor selected with selected information and requesting confirmation of the audit at step 520. If the auditor responds negatively, flow reverts back to step 518 whereby the requester must select another auditor. Once positive confirmation is received, the audit schedule is stored in audit schedules database 124 awaiting execution. Once the audit is completed, the auditor records the information via the quality information tool and attaches the results to the audit schedule at step 522. The quality information network tool generates an audit report, stores the report in the audit reports database 126, and automatically sends an e-mail at step 524 to the distribution list described above. The quality information network tool creates a summarized version of the report at step 526 and stores it in the executive summary database 129. A supplier quality performance report is generated by the tool at step 528 and stored in the supplier quality performance database 128. The results can be sent electronically to the supplier or subject of the audit at system 150 and the supplier may respond accordingly at step 530. The response may include comments or corrective actions planned or taken by the supplier. The process then ends at step 532.

The quality information network tool is a comprehensive, centralized, electronic repository for supplier audit data for use by development, procurement and manufacturing organizations to manage the supplier audit process. It is a workgroup collaboration tool that allows for the sharing of technical supplier audit data that is both internal to the organization across multiple divisions and locations, and directly with the supplier being audited. Benefits include streamlined communication with suppliers and the elimination of redundant activities. The quality information network tool provides a worldwide tool for gathering and communicating objective information about supplier quality performance and audit activity. Addition communication features include automatic e-mails to customizable distribution lists when audit records are created and completed, as well as supplier access to audit data.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for facilitating supplier auditing functions in a communications network environment, comprising:
   receiving a request from a user system of an enterprise system to initiate an activity, said activity including scheduling an audit for performing an initial or ongoing qualification of an existing or prospective trading partner of the enterprise system;
   assigning an access level to a requester at the user system with respect to at least one database;
   said enterprise system retrieving data from the at least one database, said data corresponding to said request activity selected; and
   transmitting said data to said user system based upon the access level;
   wherein said scheduling said audit includes:
      entering supplier data relating to the trading partner into a schedule form;
      entering requester information into said schedule form;
      selecting an auditor to perform said audit;
      entering a purpose for said audit;
      entering a time frame for performing said audit; and
      distributing a completed schedule form to at least one entity;
   wherein further said enterprise system includes a quality information network application for executing activity options that include the activity requested by the user system.

2. The method of claim 1, wherein said activity includes assessing a supplier record for determining a need to schedule a supplier audit.

3. The method of claim 2, wherein said assessing said supplier record includes reviewing:
   past audit activity;
   date of last audit; and results of past audits.

4. The method of claim 1, wherein said distributing said completed schedule form is automatically performed by said quality information network application via a distribution list.

5. The method of claim 1, wherein said distributing said completed schedule form is manually performed by said requester via a distribution list provided by said requester.

6. The method of claim 1, wherein said requester is a divisional user comprising at least one of an engineer and developer of the enterprise system, the divisional user requesting an audit of a trading partner that corresponds with an engineering or developer group to which the divisional user belongs.

7. The method of claim 1, wherein said selecting said auditor by said requester includes selection criteria including:
   geographic location of site to de audited;
   auditing skills possessed by said auditor;
   a commodity subject to said audit; and
   auditor pre-qualification data.

8. The method of claim 7, further comprising:
   automatically transmitting a notice to said auditor;
   receiving a response to the notice from said auditor by said requester, wherein said response is either a confirmation notice or a rejection notice.

9. The method of claim 8, wherein said requester initiates a second auditor selection, based upon receiving said rejection notice.

10. The method of claim 1, wherein said entering said time frame for performing said audit includes:
    entering a date planned for said audit; and
    entering a quarter planned for said audit.

11. The method of claim 1, wherein said activity includes viewing a scheduled audit.

12. The method of claim 11, wherein said viewing said scheduled audit includes viewing by categories, said categories including:
    all audits;
    completed audits; and
    planned audits.

13. The method of claim 11, wherein said viewing said scheduled audit includes viewing by:
    trading partner;
    region;
    quarter by region by commodity;
    year by quarter;

product category;
requester;
auditor;
organization; and
site owner.

14. The method of claim 1, wherein said activity includes providing audit reporting data by an auditor.

15. The method of claim 14, wherein said providing said audit reporting data includes;
providing audit test results;
providing audit analysis results;
providing data pertaining to deficiencies in meeting industry standards;
providing data pertaining to deficiencies in meeting government standards;
providing data pertaining to deficiencies in meeting proprietor-imposed standards;
attaching said audit reporting data to a corresponding audit schedule;
transmitting said audit reporting data and said corresponding audit schedule to a designated entity; and
proposing corrective actions.

16. The method of claim 15, wherein said transmitting said audit reporting data and said corresponding audit schedule is performed automatically by said quality information network application via a distribution list.

17. The method of claim 15, wherein said transmitting said audit reporting data and said corresponding audit schedule is performed manually by said auditor via a distribution list provided by said auditor.

18. The method of claim 1, wherein said activity includes viewing audit reports.

19. The method of claim 1, wherein said activity includes viewing training data.

20. The method of claim 19, wherein said training data includes:
lectures;
seminars;
classes; and
resource materials.

21. The method of claim 1, wherein said activity includes viewing executive summary reports.

22. The method of claim 1, wherein said activity includes viewing reference data, said reference data including:
industry standards;
government standards; and
proprietor-imposed standards.

23. A system for facilitating supplier auditing functions in a communications network environment, comprising:
a host system including a web server, an applications server, and a database server;
a data storage device in communication with said host system;
quality information network software application being executed by said host system for implementing activities;
a firewall in communication with said host system;
a workstation; and
a computer network connecting the host system to the workstation; wherein the quality information network software application performs:
receiving a request from the workstation of an enterprise of the host system to initiate an activity, said activity including scheduling an audit for performing an initial or ongoing qualification of an existing or prospective trading partner of the enterprise;
assigning an access level to a requester at the workstation with respect to at least one database of the data storage device;
retrieving data from the at least one database, said data corresponding to said requestactivity selected; and
transmitting said data to said workstation based upon the access level;
wherein said scheduling said audit includes:
entering supplier data relating to the trading partner into a schedule form;
entering requester information into said schedule form;
selecting an auditor to perform said audit;
entering a purpose for said audit;
entering a time frame for performing said audit; and
distributing a completed schedule form to at least one entity.

24. The system of claim 23, wherein said data storage device includes:
a reference database;
an audit schedule database;
an audit reports database;
an executive summary database; and
a supplier quality performance database relating to the trading partner.

25. The system of claim 23, wherein said computer network is the Internet.

26. The system a claim 23, wherein said computer network is an extranet.

27. The system of claim 23, wherein said distributing said completed schedule form is automatically performed by said quality information network application via a distribution list.

28. The system of claim 23, wherein said distributing said completed schedule form is manually performed by said requester via a distribution list provided by said requester.

29. The system of claim 23, wherein said requester is a divisional user comprising at least one of an engineer and developer of the enterprise system, the divisional user requesting an audit of a trading partner that corresponds with an engineering or developer group to which the divisional user belongs.

30. The system of claim 23 wherein said selecting said auditor by said requester includes selection criteria including:
geographic location of site to be audited;
auditing skills possessed by said auditor;
a commodity subject to said audit; and
auditor pre-qualification data.

31. The system of claim 30, further comprising:
automatically transmitting a notice to said auditor;
receiving a response to the notice from said auditor by said requester, wherein said response is either a confirmation notice or a rejection notice.

32. The system of claim 31, wherein said requester initiates a second auditor selection, based upon receiving said rejection notice.

33. A storage medium encoded with machine-readable computer program code for facilitating supplier auditing functions in a communications network environment, the storage medium including instructions for causing an enterprise system to implement a method comprising:
receiving a request from a user system associated with the enterprise system to initiate an activity, said activity including scheduling an audit for performing an initial or ongoing qualification of an existing or prospective trading partner of the enterprise system;

assigning an access level to a requester at the user system with respect to at least one database;

said enterprise system retrieving data from the at least one database, said data corresponding to said request; and transmitting said data to said user system based upon the access level;

wherein said scheduling said audit includes:
- entering supplier data relating to the trading partner into a schedule form;
- entering requester in formation into said schedule form;
- selecting an auditor to perform said audit;
- entering a purpose for said audit;
- entering a time frame for performing said audit; and
- distributing a completed schedule form to at least one entity; and
    - wherein further said enterprise system includes a quality information network application for executing activity options that includes the activity requested by the user system.

34. The storage medium of claim 33, wherein said activity includes assessing a supplier record for determining a need to schedule a supplier audit.

35. The storage medium of claim 34, wherein said assessing said supplier record includes reviewing:
- past audit activity;
- date of last audit; and
- results of past audits.

36. The storage medium of claim 33, wherein said distributing said completed schedule form is automatically performed by said quality information network application via a distribution list.

37. The storage medium of claim 33, wherein said distributing said completed schedule form is manually performed by said requester via a distribution list provided by said requester.

38. The storage medium of claim 33, wherein said requester is a divisional user comprising at least one an engineer and developer of the enterprise system, the divisional user requesting an audit of a trading partner that corresponds with an engineering or developer group to which the divisional user belongs.

39. The storage medium of claim 33, wherein said selecting said auditor by said requester includes selection criteria including:
- geographic location of site to be audited;
- auditing skills possessed by said auditor;
- a commodity subject to said audit; and
- auditor pre-qualification data.

40. The storage medium of claim 39, further comprising instructions for causing a computer to implement:
- automatically transmitting a notice to said auditor;
- receiving a response to the notice from said auditor by said requester, wherein said response is either a confirmation notice or a rejection notice.

41. The storage medium of claim 40, wherein said requester initiates a second auditor selection, based upon receiving said rejection notice.

42. The storage medium of claim 33, wherein said entering said time frame for performing said audit includes:
- entering a date planned for said audit; and
- catering a quarter planned for said audit.

43. The storage medium of claim 33, wherein said activity includes viewing a scheduled audit.

44. The storage medium of claim 43, wherein said viewing said scheduled audit includes viewing by categories, said categories including:
- all audits;
- completed audits; and
- planed audits.

45. The storage medium of claim 43, wherein said viewing said scheduled audit includes viewing by:
- trading partner;
- region;
- quarter by region by commodity;
- year by quarter;
- product category;
- requester;
- auditor:
- organization; and
- site owner.

46. The storage medium of claim 33, wherein said activity includes providing audit reporting data by an auditor.

47. The storage medium of claim 46, wherein said providing said audit reporting data includes:
- providing audit test results;
- providing analysis results;
- providing data pertaining to deficiencies in meeting industry standards;
- providing data pertaining to deficiencies in meeting government standards;
- providing data pertaining to deficiencies in meeting proprietor-imposed standards;
- attaching said audit reporting data to a corresponding audit schedule;
- transmitting said audit reporting data and said corresponding audit schedule to a designated entity; and
- proposing corrective actions.

48. The storage medium of claim 47, wherein said transmitting said audit reporting data and said corresponding audit schedule is performed automatically by said quality in formation network application via a distribution list.

49. The storage medium of claim 47, wherein said transmitting said audit reporting data and said corresponding audit schedule is performed manually by said auditor via a distribution list provided by said auditor.

50. The storage medium of claim 33, wherein said activity includes viewing audit reports.

51. The storage medium of claim 33, wherein said activity includes viewing training data.

52. The storage medium of claim 51, wherein said training data includes:
- lectures;
- seminars;
- classes; and
- resource materials.

53. The storage medium of claim 33, wherein said activity includes viewing executive summary reports.

54. The storage medium of claim 33, wherein said activity includes viewing reference data, said reference data including:
- industry standards;
- government standards; and
- proprietor-imposed standards.

55. A method for facilitating supplier auditing functions in a communications network environment, comprising:
- receiving a request from a first enterprise system to contact a web site maintained by a second enterprise system, the first enterprise system comprising a trading partner of the second enterprise system;

said second enterprise system authenticating a user ID and password of a user of said first enterprise system;

receiving a request from the first enterprise system to initiate an activity, said activity including viewing results of an audit performed on the trading partner by the second enterprise system;

assigning an access level to the first enterprise system with respect to at least one database;

said second enterprise system retrieving data corresponding to said request from the at least one database, said data including results of the audit; and transmitting said data to said first enterprise system based upon the access level;

wherein said second enterprise system includes a quality information network application for executing activity options including the activity requested by the first enterprise systems;

replicating selected data fields of a database associated with said second enterprise system resulting from a request by said first enterprise to submit data into a supplier response form, said request associated with a first of said activity options;

providing access to said database;

displaying said supplier response form;

receiving response data from said first enterprise system, said response data provided in said supplier response form;

storing said response data in said database; and associating said response data with an entity within said second enterprise system.

56. The method of claim 55, wherein said entity is a division.

57. The method of claim 55, wherein said entity is a commodity.

58. The method of claim 55, further comprising:
receiving an attached text file with said response data.

59. The method of claim 55, wherein said associating said response data with said entity includes:
sending a notification to said entity; and
making said response data available to said entity.

60. The method of claim 55, wherein said first enterprise system is a supplier.

61. The method of claim 55, wherein said first enterprise system is a contract manufacturer.

62. The method of claim 55, wherein said first enterprise system is a trading partner.

63. A storage medium encoded with machine-readable computer program code for facilitating supplier auditing functions in a communications network environment, the storage medium including instructions for causing an enterprise system to implement a method comprising:

receiving a request from a first enterprise system to contact a web site maintained by a second enterprise system, the first enterprise system including a trading partner of the second enterprise system;

said second enterprise system authenticating a user ID and password of a user of said first enterprise system;

receiving a request from the first enterprise system to initiate an activity, said activity including reviewing results of an audit performed on the trading partner by the second enterprise;

assigning an access level to a requester at the first enterprise system with respect to at least one database;

said second enterprise system retrieving data corresponding to said request from the at least one database, said data including the results of the audit; and transmitting said data to said first enterprise system based upon the access level;

wherein said second enterprise system includes a quality information network application for executing activity options including the activity requested by the first enterprise system;

replicating selected data fields of a database associated with said second enterprise system resulting from a request by said first enterprise to submit data into a supplier response form, said request associated with a first of said activity options;

providing access to said database;

displaying said supplier response form;

receiving response data from said first enterprise system, said response data provided in said supplier response form;

storing said response data in said database; and associating said response data with an entity within said second enterprise system.

64. The storage medium of claim 63, wherein said entity is a division.

65. The storage medium of claim 63, wherein said entity is a commodity.

66. The storage medium of claim 63, further comprising instructions for causing a computer to implement:
receiving an attached text file with said response data.

67. The storage medium of claim 63, wherein said associating said response data with said entity includes:
sending a notification to said entity; and
making said response data available to said entity.

68. The storage medium of claim 63, wherein said first enterprise system is a supplier.

69. The storage medium of claim 63, wherein said first enterprise system is a contract manufacturer.

70. The storage medium of claim 63, wherein said first enterprise system is a trading partner.

* * * * *